US012734977B2

(12) United States Patent
Toriz Vega et al.

(10) Patent No.: US 12,734,977 B2
(45) **Date of Patent: *Sep. 15, 2026**

(54) VEHICLE TRIM ASSEMBLY WITH INTERCHANGEABLE ATTACHMENT FEATURES

(71) Applicant: Ford Global Technologies, LLC, Dearborn, MI (US)

(72) Inventors: Jose Luis Toriz Vega, Metepec (MX); Joaquin Andres Araya Salinas, Huixquilucan (MX); Raul Rafael Martinez Huesca, Atizapan de Zaragoza (MX); Jose Nicolas Juarez Espinoza, Cuajimalpa de morelos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/937,856

(22) Filed: Nov. 5, 2024

(65) Prior Publication Data

US 2025/0065822 A1 Feb. 27, 2025

Related U.S. Application Data

(63) Continuation of application No. 17/746,280, filed on May 17, 2022, now Pat. No. 12,172,586.

(51) Int. Cl.
*B60R 13/02* (2006.01)
*B60N 3/02* (2006.01)
(Continued)

(52) U.S. Cl.
CPC ............ *B60R 13/0206* (2013.01); *F16B 2/20* (2013.01); *B60N 3/02* (2013.01); *B60R 13/025* (2013.01); *F16B 5/0628* (2013.01); *F16B 5/0657* (2013.01)

(58) Field of Classification Search
CPC ....... B60N 3/02; B60R 13/02; B60R 13/0206; B60R 13/025; F16B 2/20; F16B 5/128; F16B 5/0628; F16B 5/0657
See application file for complete search history.

(56) References Cited

U.S. PATENT DOCUMENTS 5,195,793 A 3/1993 Maki
5,876,084 A 3/1999 Smith et al.
(Continued)

FOREIGN PATENT DOCUMENTS

JP 2005299839 A 10/2005
WO WO-2024170713 A1 * 8/2024 ............ F16B 5/0036

*Primary Examiner* — Gregory A Blankenship
(74) *Attorney, Agent, or Firm* — Vichit Chea; Price Heneveld LLP

(57) ABSTRACT

A vehicle trim assembly includes a trim panel, which defines a retaining member that includes a connector and an engagement plate. The engagement plate has a width greater than a width of the connector. The engagement plate includes a locking arm. A first attachment feature is engageable with the retaining member in a first use condition. A second attachment feature is engageable with the retaining member in a second use condition. The first and second attachment features each include a base having a proximal support and a distal support, a clip coupled to the distal support and configured to engage a vehicle body, and guide features coupled to the proximal support. The guide features are configured to receive the engagement plate of the retaining member. A protrusion is coupled to the proximal support. The locking arm is configured to engage the protrusion to lock the base on the retaining member.

20 Claims, 16 Drawing Sheets

(51) Int. Cl.

| | |
|---|---|
| ***F16B 2/20*** | (2006.01) |
| *F16B 5/06* | (2006.01) |

(56) References Cited

U.S. PATENT DOCUMENTS

| | | | | |
|---|---|---|---|---|
| 6,196,607 | B1 | 3/2001 | Gulisano | |
| 6,435,602 | B1 | 8/2002 | Sukegawa et al. | |
| 9,216,703 | B2 | 12/2015 | Lauxen et al. | |
| 10,017,129 | B2 | 7/2018 | Avendano Arenas et al. | |
| 10,894,517 | B2 | 1/2021 | Koehler et al. | |
| 11,104,286 | B2 | 8/2021 | Boardman et al. | |
| 12,172,586 | B2 * | 12/2024 | Toriz Vega | B60N 3/026 |
| 2005/0079009 | A1 | 4/2005 | Benedetti et al. | |
| 2011/0221236 | A1 | 9/2011 | She | |
| 2013/0117969 | A1 | 5/2013 | Mazur | |
| 2013/0259595 | A1 | 10/2013 | Hiramatsu et al. | |
| 2017/0050584 | A1 | 2/2017 | Knieper et al. | |
| 2017/0051780 | A1 | 2/2017 | Dickinson et al. | |
| 2018/0361950 | A1 | 12/2018 | Baranowski et al. | |
| 2020/0139919 | A1 | 5/2020 | Beltran | |
| 2023/0220861 | A1 | 7/2023 | Dickinson et al. | |
| 2023/0373406 | A1 | 11/2023 | Toriz Vega et al. | |
| 2026/0016035 | A1 * | 1/2026 | Lepper | F16B 5/065 |

* cited by examiner

VEHICLE TRIM ASSEMBLY WITH INTERCHANGEABLE ATTACHMENT FEATURES

CROSS-REFERENCE TO RELATED APPLICATIONS

This application is a continuation of U.S. patent application Ser. No. 17/746,280, filed May 17, 2022, now U.S. Pat. No. 12,172,586, entitled "VEHICLE TRIM ASSEMBLY WITH INTERCHANGEABLE ATTACHMENT FEATURES," the full disclosure of which is incorporated herein by reference.

FIELD OF THE DISCLOSURE

The present disclosure generally relates to a vehicle trim assembly. More specifically, the present disclosure relates to a vehicle trim assembly with interchangeable attachment features.

BACKGROUND OF THE DISCLOSURE

Many vehicles include trim substrates in multiple locations of the vehicle. The trim substrates are coupled to the vehicle via trim attachments.

SUMMARY OF THE DISCLOSURE

According to at least one aspect of the present disclosure, a vehicle trim assembly includes a trim panel having an A-surface and a B-surface. The trim panel defines a retaining member on the B-surface. The retaining member includes a connector extending from the B-surface. An engagement plate is coupled to the connector. The engagement plate has a width greater than a width of the connector. The engagement plate includes a locking arm extending therefrom. A first attachment feature is engageable with the retaining member in a first use condition. A second attachment feature is engageable with the retaining member in a second use condition. Each of the first attachment feature and the second attachment feature includes a base having a proximal support and a distal support, a clip coupled to the distal support and configured to engage a vehicle body, and guide features coupled to the proximal support. The guide features are configured to receive the engagement plate of the retaining member. A protrusion is coupled to the proximal support. The locking arm is configured to engage the protrusion to lock the base on the retaining member.

According to another aspect of the present disclosure, a trim assembly for a vehicle includes a trim panel having an inner surface. The trim panel integrally defines a retaining member on the inner surface. The retaining member includes a locking arm. At least one attachment feature is engageable with the trim panel via the retaining member. The at least one attachment feature includes a base having a proximal support and a distal support. A clip is coupled to the distal support and configured to engage a body panel. Guide features are coupled to the proximal support and configured to receive the retaining member to couple the at least one attachment feature to the trim panel. A protrusion is coupled to the proximal support. The locking arm is configured to engage the protrusion to lock the at least one attachment feature to the trim panel.

According to another aspect of the present disclosure, a vehicle trim attachment feature includes a base having a distal support spaced from a proximal support via side supports. The distal support, the proximal support, and the side supports define a cavity. A clip is coupled to the distal support and configured to engage a vehicle body panel. A first guide feature is coupled to the proximal support. A second guide feature is coupled to the proximal support and extends parallel to the first guide feature. The first guide feature and the second guide feature are configured to slidably receive a retaining member of a trim panel. A protrusion is coupled to the proximal support proximate to the first guide feature and the second guide feature. The protrusion is configured to engage the retaining member to retain the body in a select position on the trim panel.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
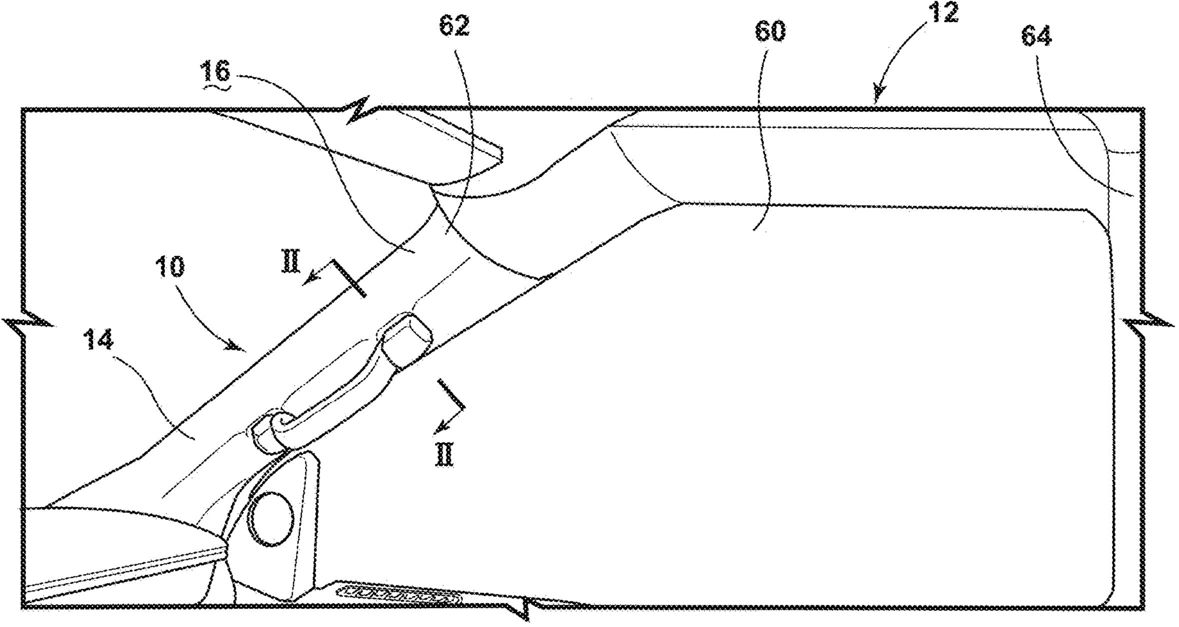
FIG. 1 is a side perspective view of a trim panel on an A-pillar within an interior of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-18, reference numeral 10 generally designates a trim assembly 10 for a vehicle 12 that includes a trim substrate or panel 14 having an outer or A-surface 16 and an inner or B-surface 18. The trim panel 14 defines a retaining member 20 on the B-surface 18. The retaining member 20 includes a connector 22 extending from the B-surface 18 and an engagement plate 24 coupled to the connector 22. The engagement plate 24 has a width greater than a width of the connector 22. The engagement plate 24 includes a locking arm 26 extending therefrom. The trim assembly 10 also includes at least one attachment feature 28, including at least a first attachment feature 30 and a second attachment feature 32. The first attachment feature 30 is engageable with the retaining member 20 in a first use condition, and the second attachment feature 32 is engageable with the retaining member 20 and a second use condition. Each attachment feature 28 includes a base 34 having a proximal support 36 and a distal support 38, a clip 40 coupled to the distal support 38 and configured to engage the vehicle body 42, and guide features 44, 46 coupled to the proximal support 36. The guide features 44, 46 are configured to receive the engagement plate 24 of the retaining member 20. Each attachment feature 28 also includes a protrusion 48 coupled to the proximal support 36. The locking arm 26 is configured to engage the protrusion 48 to lock the base 34 and the retaining member 20.

Figure 2:
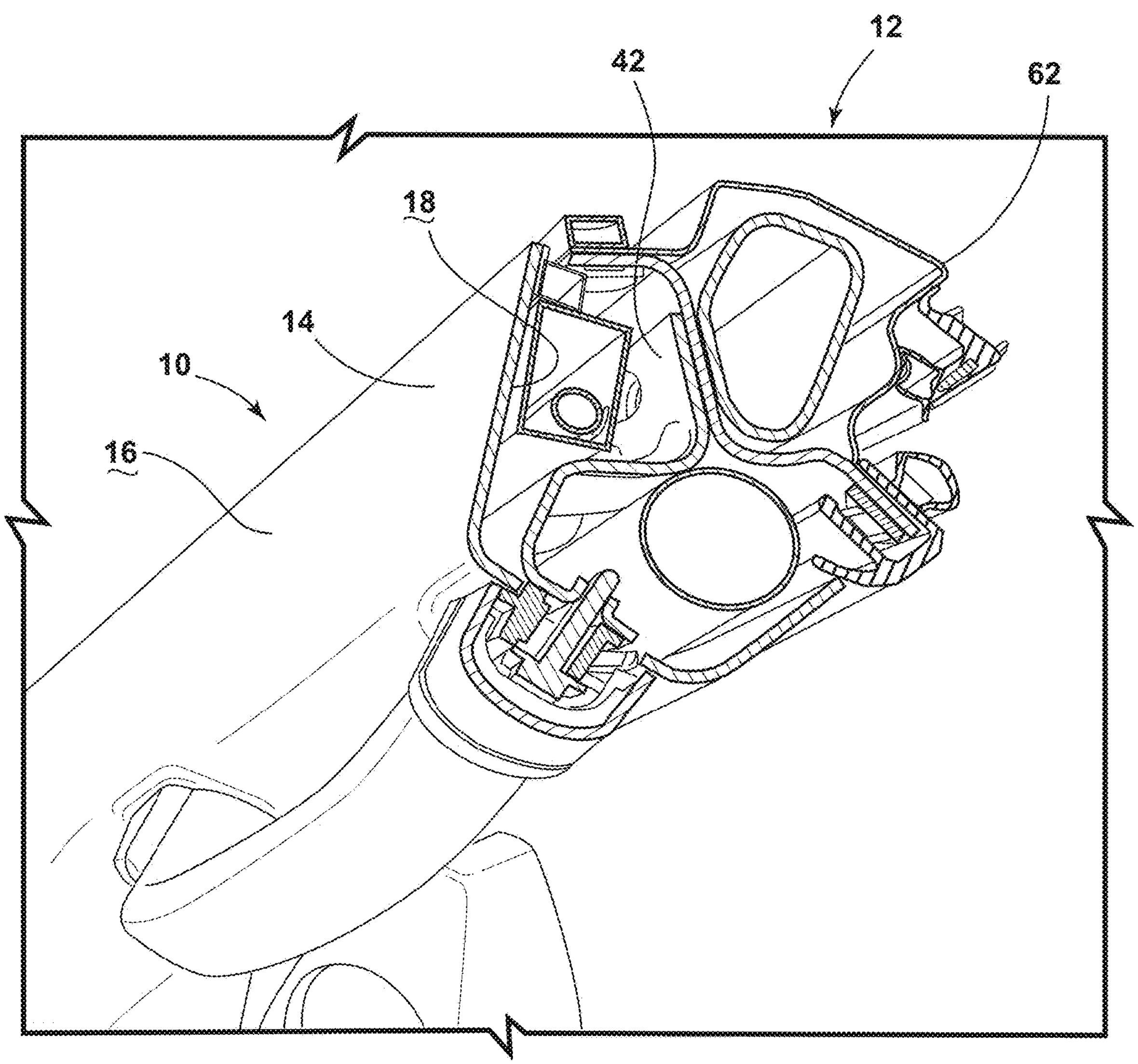
FIG. 2 is a cross-sectional view of the A-pillar of FIG. 1, taken along lines II-II, according to the present disclosure.

Referring to FIGS. 1 and 2, the vehicle 12 includes the vehicle body 42, which defines an interior 60 of the vehicle 12. The vehicle body 42 is generally constructed of metal or metal alloy materials. In certain aspects, the vehicle body 42 is constructed of multiple body panels. The vehicle body 42 defines various pillars, such as an A-pillar 62, a B-pillar 64, etc. The vehicle 12 may include a variety of trim assemblies 10 configured to couple to the vehicle body 42 to provide various features or aesthetics for the vehicle 12. The trim assemblies 10 are generally positioned within the interior 60 and coupled to the body panels. For example, as illustrated in FIGS. 1 and 2, the trim assembly 10 is coupled to the A-pillar 62. In such examples, the trim panel 14 may be an interior pillar feature. In additional or alternative examples, the trim assembly 10 may be coupled to any of the pillars, a dashboard, a console, or any practicable locations of the vehicle 12.

Figure 3:
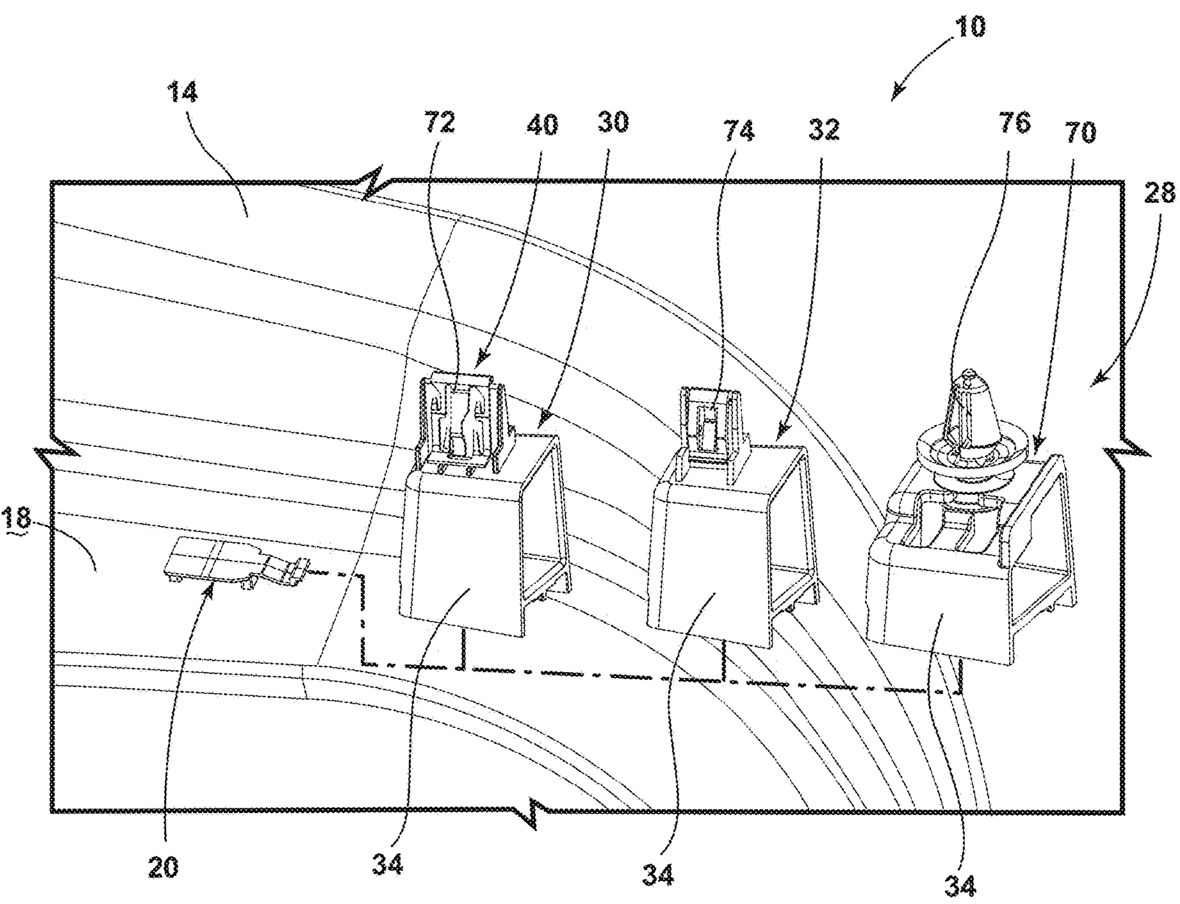
FIG. 3 is an exploded view of a trim assembly with a trim panel and multiple attachment features, according to the present disclosure.
Figure 4:
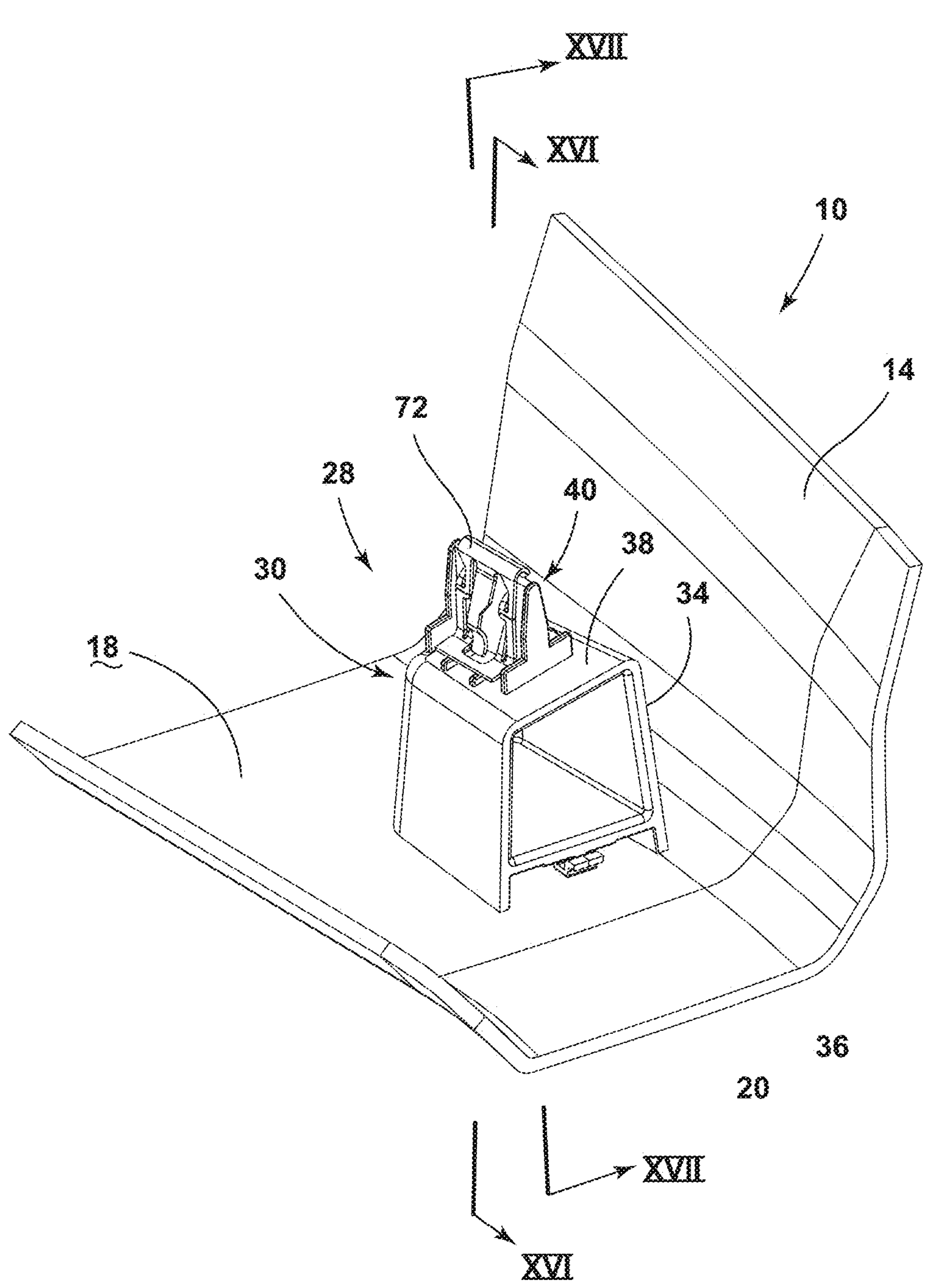
FIG. 4 is a side perspective view of a trim assembly with an attachment feature coupled to a trim panel, according to the present disclosure.
Figure 5:
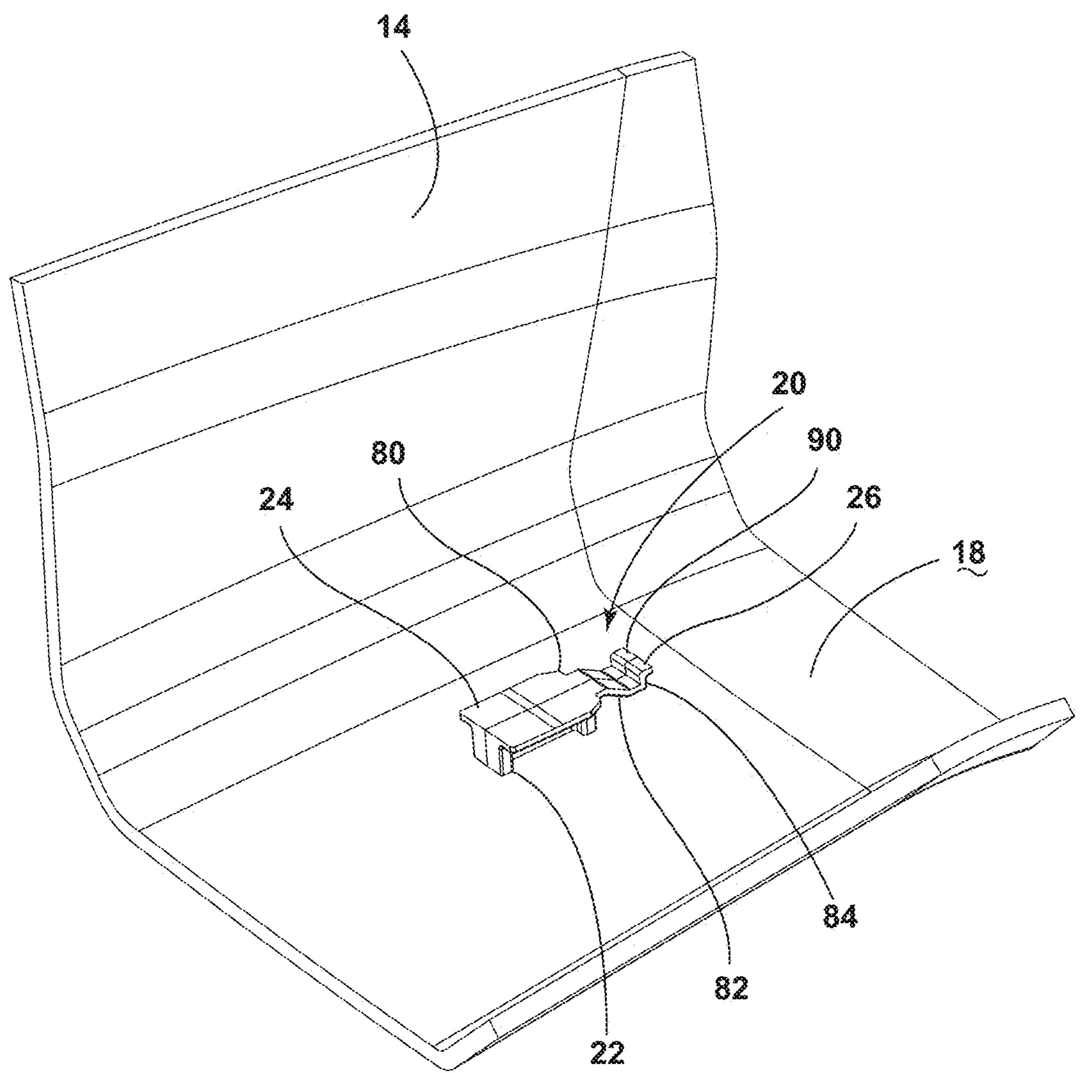
FIG. 5 is a side perspective view of a retaining member on a trim panel, according to the present disclosure.
Figure 6:
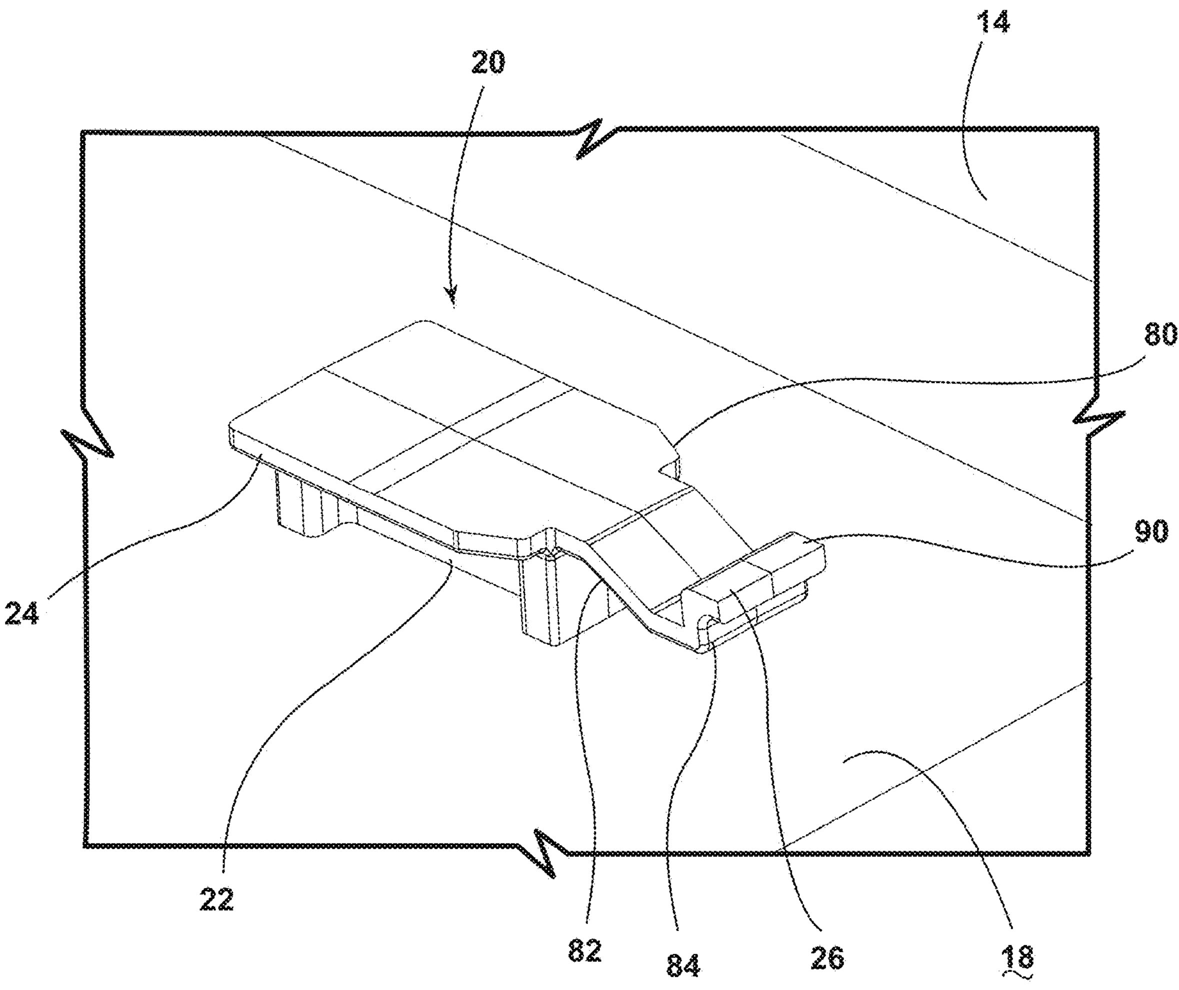
FIG. 6 is a side perspective view of a retaining member on a trim panel, according to the present disclosure.
Figure 7:
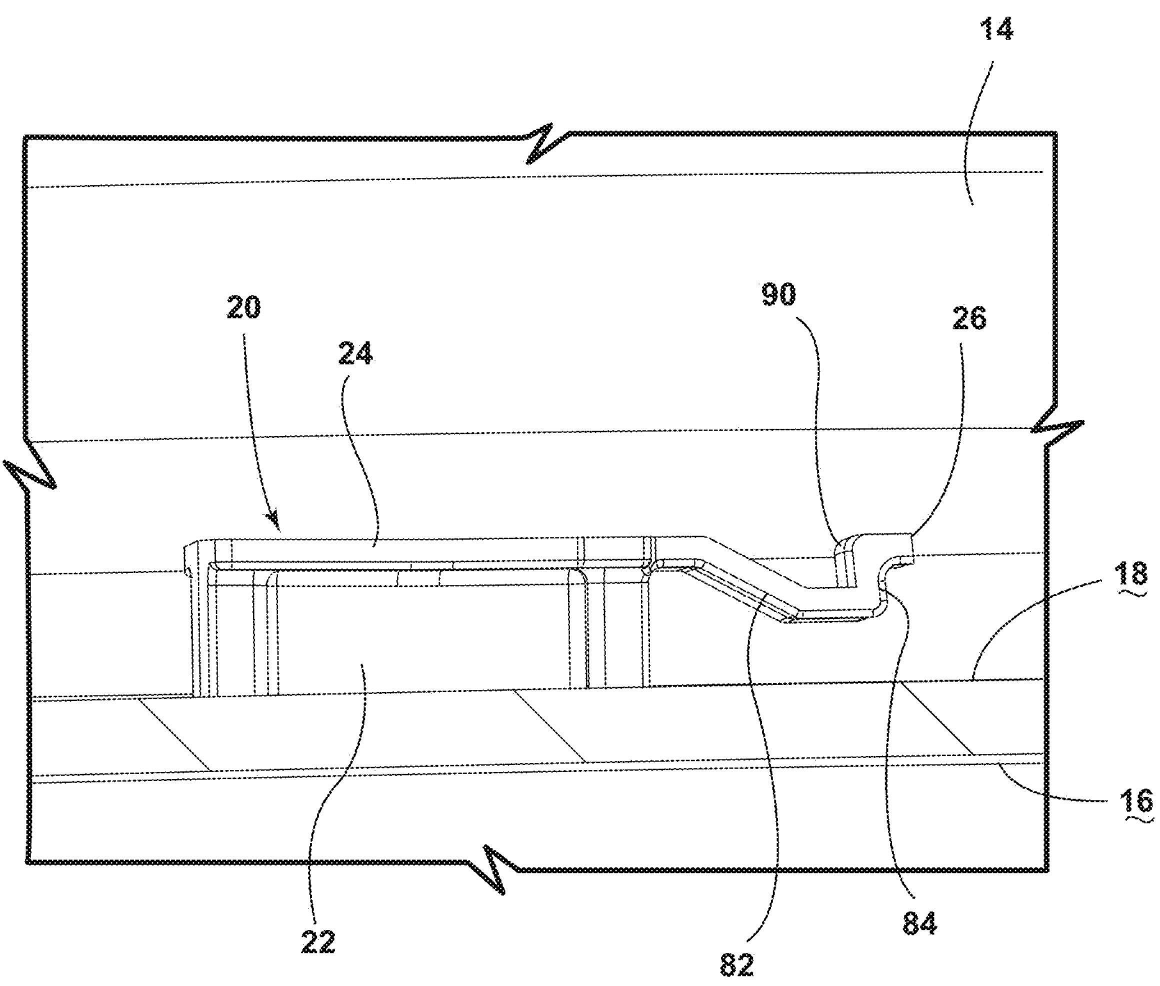
FIG. 7 is a side elevation view of a retaining member on a trim panel, according to the present disclosure.

Referring still to FIG. 2, as well as FIGS. 3 and 4, the trim assembly 10 includes the trim panel 14 and interchangeable attachment features 28. The attachment features 28, in the illustrated example, include the first attachment feature 30, the second attachment feature 32, and a third attachment feature 70. Other configurations of the attachment feature 28 may be utilized without departing from the teachings herein. Moreover, additional attachment features 28 may be utilized with the trim panel 14. The attachment features 28 are configured to engage, extend through, or otherwise couple to the vehicle body 42 to secure the trim panel 14 thereto. The type of attachment feature 28 utilized may depend on the configuration of the trim panel 14, the configuration of the vehicle body 42, the location of the trim assembly 10, etc.

The first, second, and third attachment features 30, 32, 70, collectively referred to herein as the attachment features 28, each includes the base 34 and the clip 40. Each attachment feature 28 includes a different type of clip 40, such that the first attachment feature 30 includes a first clip 72, the second attachment feature 32 includes a second clip 74, and the third attachment feature 70 includes a third clip 76. The first, second, and third clips 72, 74, 76 are collectively referred to herein as the clips 40. The attachment features 28 may be interchanged to couple the different types of clips 40 to the trim panel 14.

Referring still to FIG. 4, the trim panel 14 includes the retaining member 20 on the B-surface 18 thereof. As used herein, the term "A-surface" refers to a surface of any component within the vehicle body 42 that is visible and/or contactable by an occupant in the vehicle when the component is in an assembled state. The A-surface 16 faces or is oriented toward the interior 60 of vehicle 12. Contrastingly, the term "B-surface" refers to a surface of any component in the vehicle 12 that is concealed and/or not contactable by an occupant of vehicle 12 when the component is in an assembled state. The B-surface 18 is generally oriented toward the vehicle body 42. Accordingly, the A-surface 16 is generally the outer surface, while the B-surface 18 is generally the inner surface.

The attachment feature 28 is configured to couple to the retaining member 20 on the B-surface 18 of the trim panel 14. The retaining member 20 retains the attachment feature 28 in the select position on the trim panel 14. The attachment feature 28 is concealed between the trim panel 14 and the vehicle body 42 (FIG. 1) when the trim assembly 10 is installed. The different attachment features 28 may be interchanged with one another, often depending on the type of clip 40. In this way, the first attachment feature 30 is coupled to the trim panel 14 in the first use condition, the second attachment feature 32 is coupled to the trim panel 14 in the second use condition, and the third attachment feature 70 is coupled to the trim panel 14 in a third use condition. Additionally, the trim panel 14 may include multiple retaining members 20. In such examples, the same type of attachment feature 28 may be coupled to each retaining member 20, or different attachment features 28 may be coupled to the retaining members 20.

Referring to FIGS. 5-8, the trim panel 14 includes the retaining member 20 integrally formed or defined on the B-surface 18 thereof. The retaining member 20 includes the connector 22 and the engagement plate 24. The connector 22 extends from the B-surface 18 and the engagement plate 24 is coupled to a distal end of the connector 22, spaced from the B-surface 18. In the illustrated example, the connector 22 and the engagement plate 24 are integrally formed with one another as a single component but may be multiple components coupled together.

Figure 8:
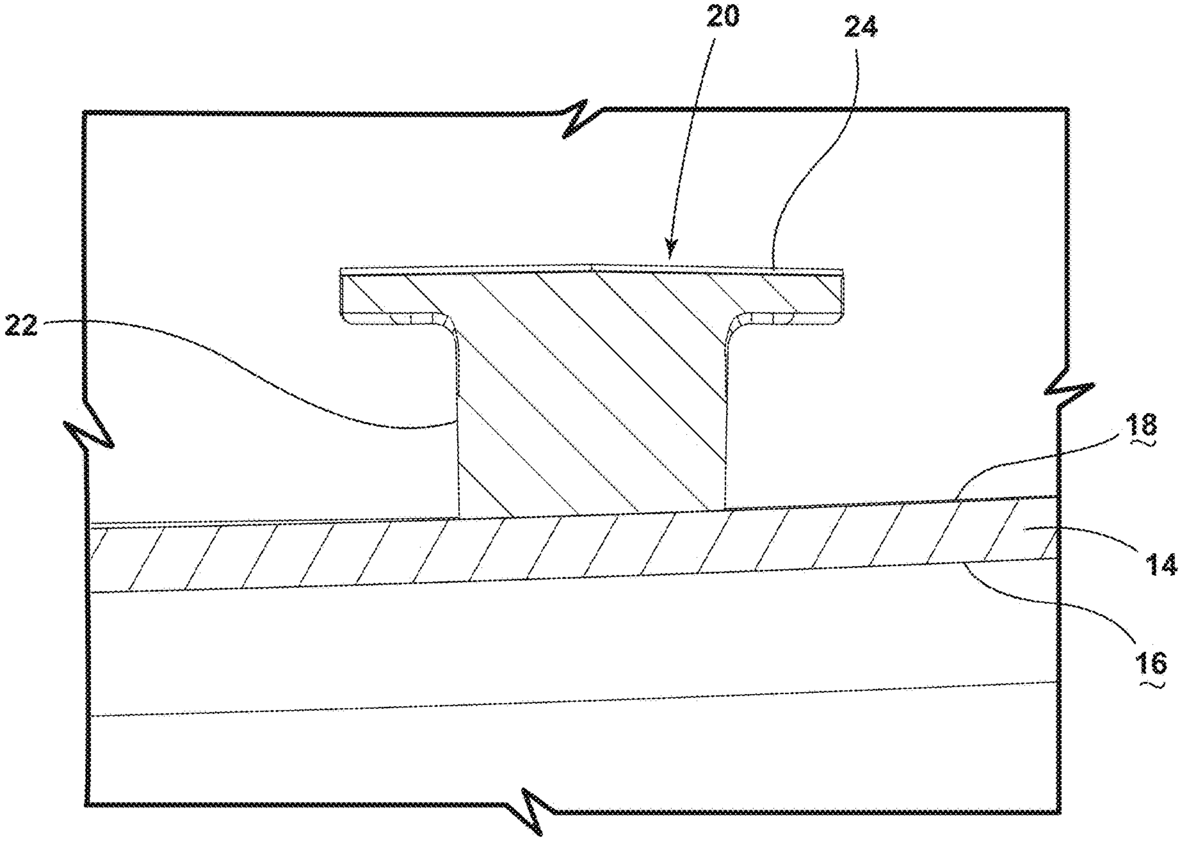
FIG. 8 is a side elevation view of a retaining member on a trim panel, according to the present disclosure.
Figure 9:
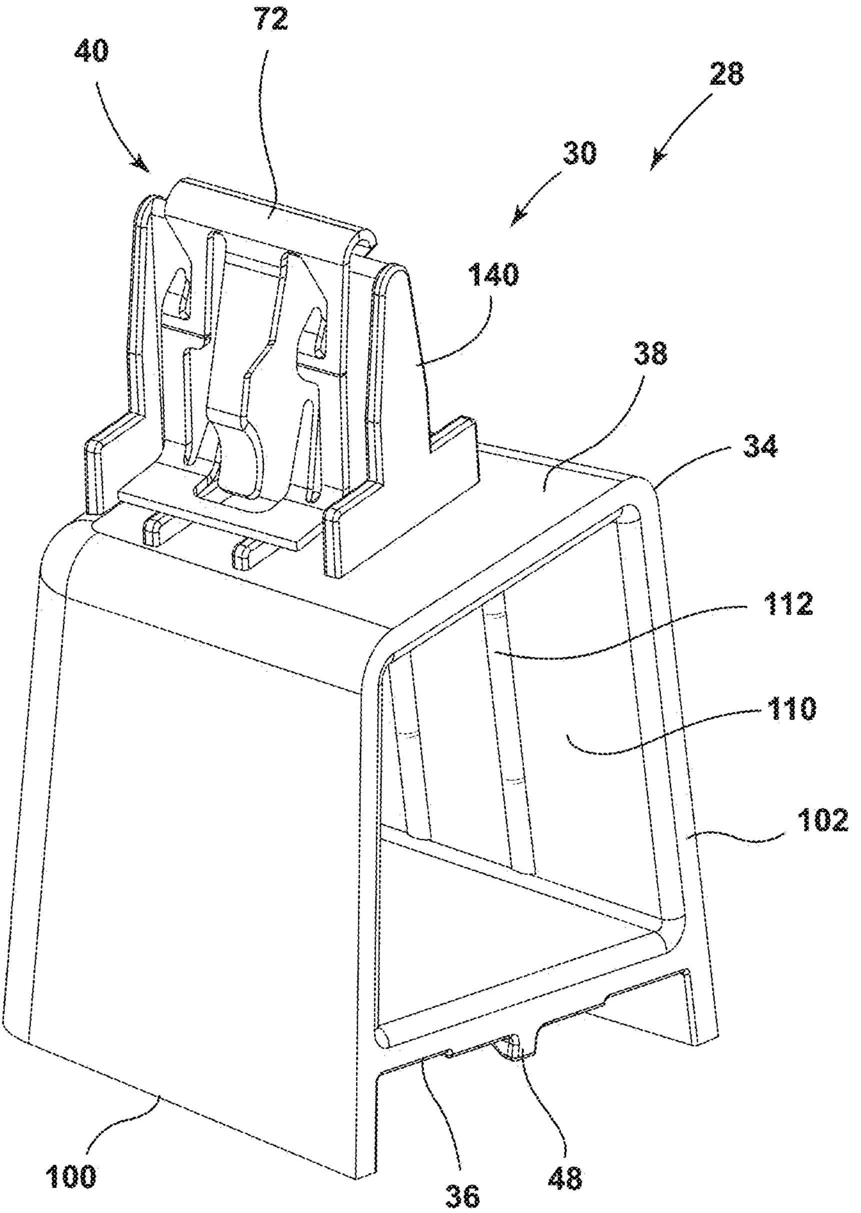
FIG. 9 is a side perspective view of an attachment feature for a vehicle trim assembly, according to the present disclosure.

The connector 22 has the first width and the engagement plate 24 has the second width, which is greater than the first width. Generally, the retaining member 20 has a "T" cross-sectional shape, as illustrated in FIG. 8. In the illustrated example, the connector 22 has ends that are wider than a center portion (e.g., generally an "I" shape), which may assist in the sliding engagement with the attachment feature 28 (FIG. 3). It is contemplated that the width of the connector 22 may be substantially consistent along a length of the connector 22 without departing from the teachings herein.

The engagement plate 24 generally has a tapered end 80 proximate the locking arm 26. The tapered end 80, which has a width less than the opposing end of the engagement plate 24, remains wider than the connector 22. The widening of the engagement plate 24 from proximate to the locking arm 26 to the opposing end may assist with the sliding engagement with the attachment feature 28 (FIG. 3).

Referring still to FIGS. 5-8, the locking arm 26 extends from the tapered end 80 of the engagement plate 24. The locking arm 26 generally includes a receiving portion 82 and a retaining portion 84. The receiving portion 82 extends from the engagement plate 24, extending partially toward the B-surface 18 of the trim panel 14 and partially parallel with the engagement plate 24. The retaining portion 84 extends from the receiving portion 82 and away from the B-surface 18. The receiving portion 82 may extend substantially perpendicularly from a distal end of the receiving portion 82. A space defined by the locking arm 26 between the receiving portion 82 and the retaining portion 84 may be generally a wedge or slanted "V" shape to correspond to a shape of protrusion 48.

The receiving portion 82 includes a distal tab 90 that extends generally perpendicular to the retaining portion 84 and parallel with the engagement plate 24. A surface of the engagement plate 24 and a surface of the distal tab 90 may be generally coplanar when in a default condition. The locking arm 26 is biased towards the default condition.

The locking arm 26 is configured to flex or elastically deform in response to a force applied on the distal tab 90. The locking arm 26 is configured to flex out of the default condition and toward the B-surface 18. In certain aspects, a junction between the receiving portion and the retaining portion 84 is moved toward, or into contact with, the B-surface 18. Additionally or alternatively, the receiving portion 82 may be adjusted away from the engagement plate 24, increasing an angle defined between the receiving portion 82 and the retaining portion 84 (e.g., generally an obtuse angle). The increased angle may increase the space or change the shape of the space defined between the receiving portion 82 and the retaining portion 84. As the locking arm 26 is biased toward the default condition when the force is removed from the distal tab 90, the locking arm 26 returns to the default condition.

Referring to FIGS. 9-12, the first attachment feature 30 is illustrated. The base 34 has the proximal support 36 and the distal support 38 spaced from one another. The distal support 38 is coupled to the proximal support 36 via multiple side supports 100, 102, 104. In the illustrated configuration, there are three side supports 100, 102, 104, leaving an open side. The first and second side supports 100, 102 generally extends a greater length from the distal support 38 relative to the third side support 104, extending beyond the proximal support 36. The third side support 104, which extends between the first and second side supports 100, 102 opposite the open end, generally extends from the distal support 38 to the proximal support 36. In various aspects, the base 34 may be referred to as a doghouse or doghouse feature.

The base 34 defines an interior cavity 110. The interior cavity 110 may be advantageous for reducing weight of the attachment feature 30 and for providing a more efficient manufacturing process. The base 34 may also include a rib 112 or ribs 112, which extend along at least one surface in the interior cavity 110. The ribs 112 may protrude into the interior cavity 110 and provide additional support to the first attachment feature 30.

Figure 10:
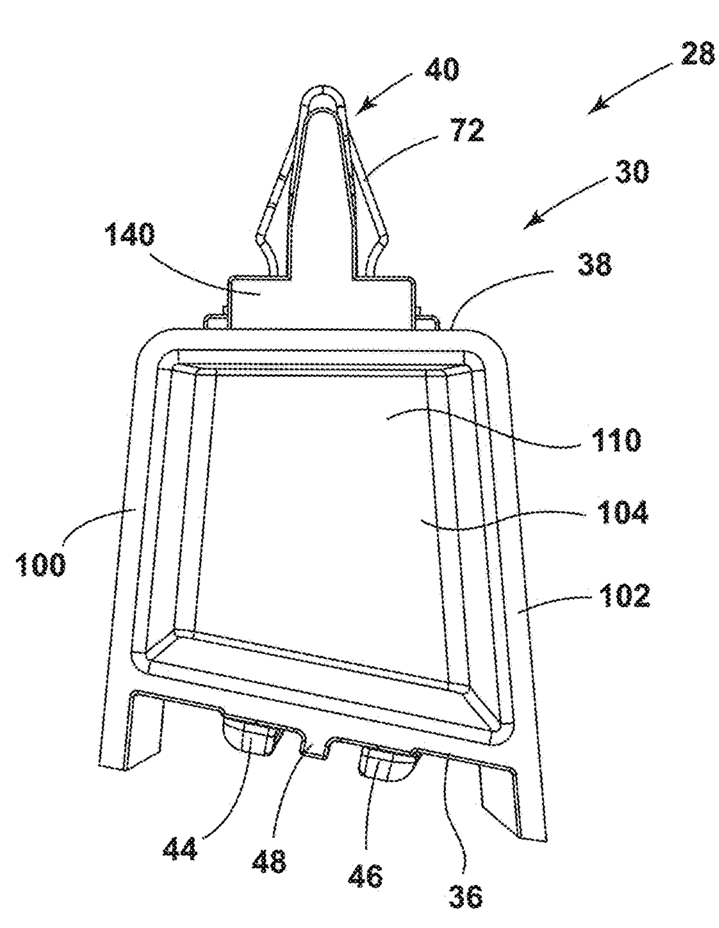
FIG. 10 is a side elevation view of an attachment feature for a vehicle trim assembly, according to the present disclosure.
Figure 11:
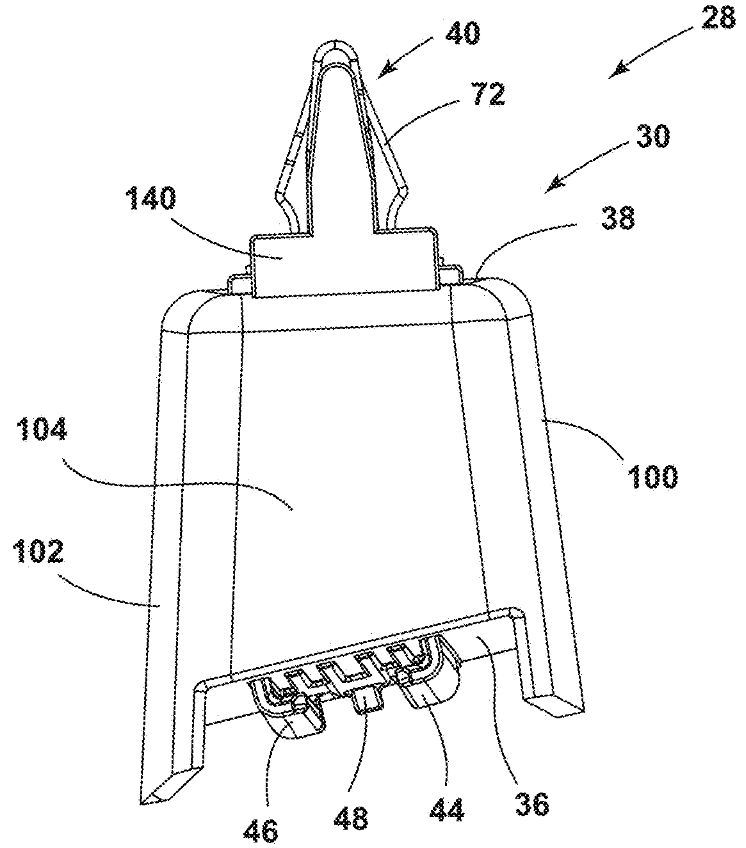
FIG. 11 is a side elevation view of an attachment feature for a vehicle trim assembly, according to the present disclosure.

As illustrated in FIGS. 10 and 11, the base 34 of the first attachment feature 30 may be shaped based on the trim panel 14 and the first clip 72. For example, in the illustrated configuration, the proximal support 36 extends at an oblique angle (e.g., obliquely oriented) between the first and second side supports 100, 102. In this way, one side of the proximal support 36 is further from the distal support 38 than the opposing side. Additionally, in the illustrated configuration, the first side support 100 is shorter than the second side support 102. Moreover, the proximal support 36 is configured to be spaced from the trim panel 14 (FIG. 3) by the first and second side supports 100, 102.

The first and second guide features 44, 46 are coupled to the proximal support 36, outside the interior cavity 110 and between the first and second side supports 100, 102 where the first and second side supports 100, 102 extend beyond the proximal support 36. The guide features 44, 46 extend along a surface of the proximal support 36 and are arranged parallel to one another. The arrangement of the guide features 44, 46 may differ based on the configuration of the engagement plate 24 (FIG. 3). The first and second guide features 44, 46 extend in a same direction as the first and second side supports 100, 102, extending between the third side support 104 and the open side of the base 34. The first and second guide features 44, 46 are elongated structures that have a rail or hook-like shape to slidably receive and support the engagement plate 24.

Figure 12:
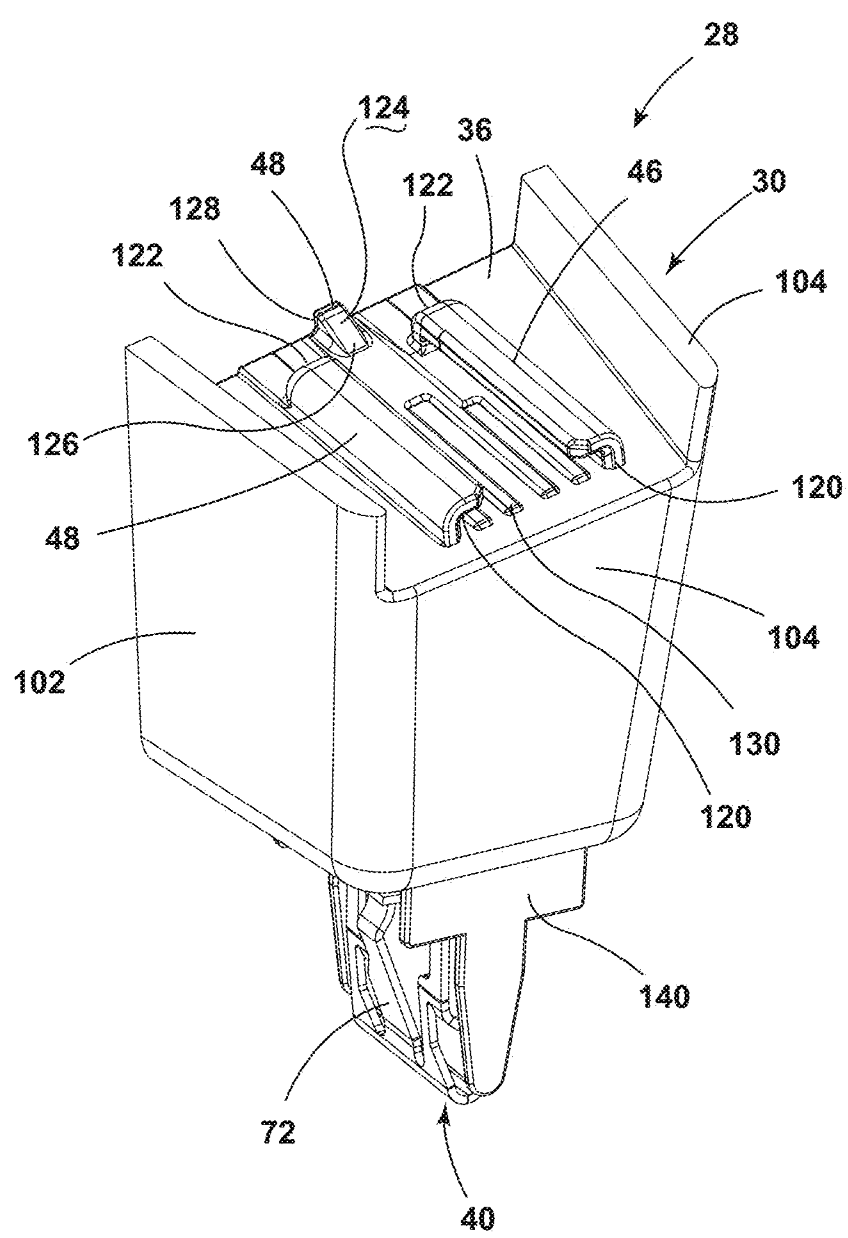
FIG. 12 is a bottom perspective view of an attachment feature for a vehicle trim assembly, according to the present disclosure.

Referring still to FIGS. 10 and 11, as well as FIG. 12, the first and second guide features 44, 46 have open ends 120 for receiving the engagement plate 24 and closed ends 122. In the illustrated configuration, the open ends 120 are disposed proximate to the third side support 104 and the closed ends 122 are disposed proximate to the open side; however, the reverse is contemplated without departing from the teachings herein.

The protrusion 48 is coupled to the proximal support 36 proximate the first and second guide features 44, 46. In the illustrated configuration, the protrusion 48 is centrally located between the first and second side features proximate to the closed ends 122 thereof. The protrusion 48 is generally wedge-shaped having an angled sliding or engagement surface 124. An inner end 126 of the protrusion 48 proximate the closed ends 122 of the guide features 44, 46 has a height that is less than a height of an outer end 128 of the protrusion 48 proximate the open side of the base 34. Accordingly, the protrusion 48 increases in height closer to an edge of the proximal support 36.

In various aspects, the base 34 includes ribs 130 on the proximal support 36 between the guide features 44, 46. The ribs 130 extend generally parallel to the guide features 44, 46. The ribs 130 may provide additional support to the base 34 while promoting the sliding engagement between the base 34 and the retaining member 20 (FIG. 3).

Referring still to FIGS. 10-12, the first attachment feature 30 includes the first clip 72 coupled to the distal support 38. The first clip 72 extends away from the base 34 and, when coupled to the trim panel 14 (FIG. 3), also extends away from the trim panel 14. The first clip 72 is illustrated as a metal clip disposed over a clip support 140. The clip support 140 may be integrally formed with the base 34 or coupled to the base 34 with the first clip 72.

Figure 13:
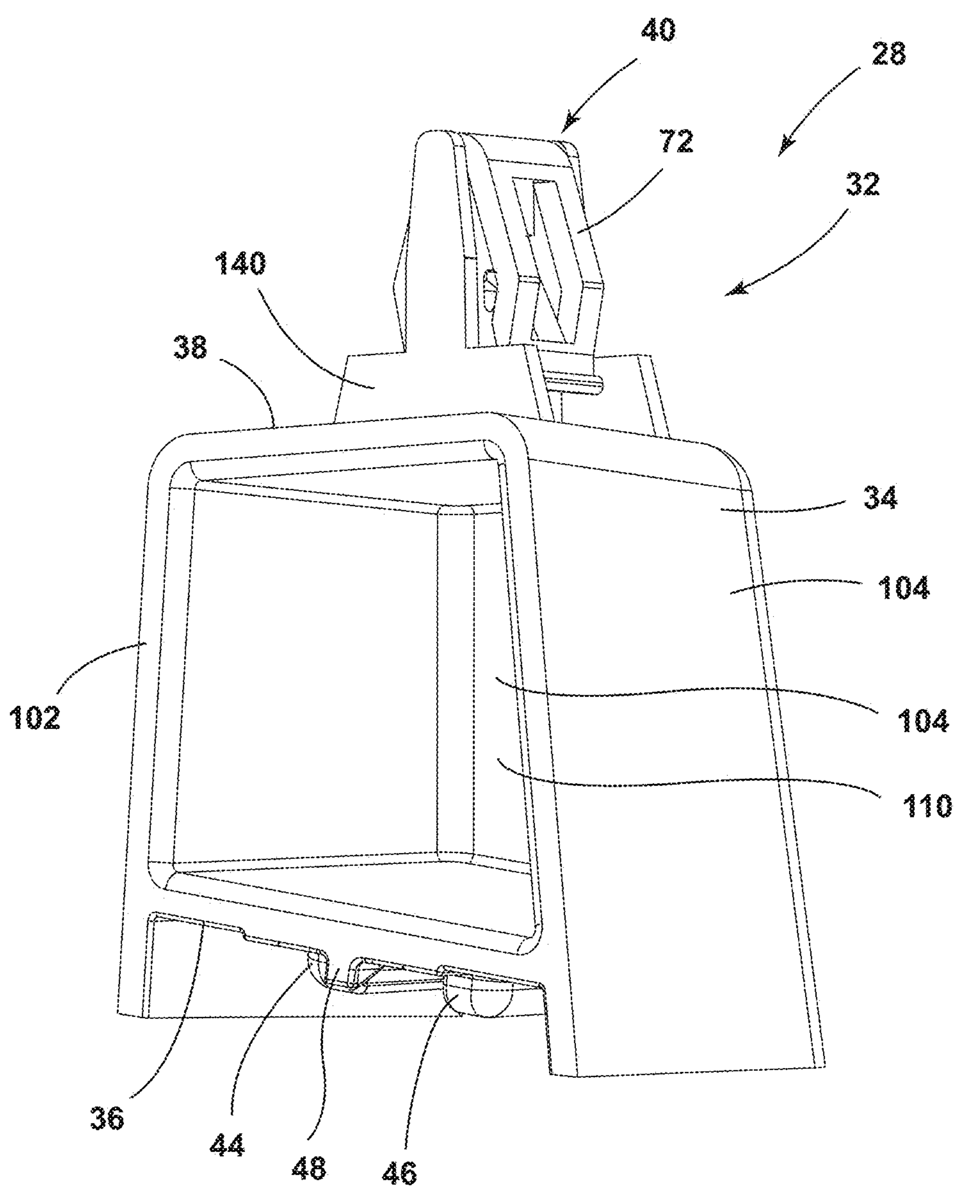
FIG. 13 is a side perspective view of another attachment feature for a vehicle trim assembly, according to the present disclosure.

Referring now to FIG. 13, the second attachment feature 32 is illustrated. The second attachment feature 32 includes the base 34, with the first and second guide features 44, 46 and the protrusion 48, and is constructed similarly to the base 34 for the first attachment feature 30. Accordingly, the configuration of the base 34 described herein with respect to the first attachment feature 30 also applies to the second attachment feature 32. The second attachment feature 32 includes the second clip 74 coupled to the clip support 140. The second clip 74 is generally a plastic clip disposed over the clip support 140.

Figure 14:
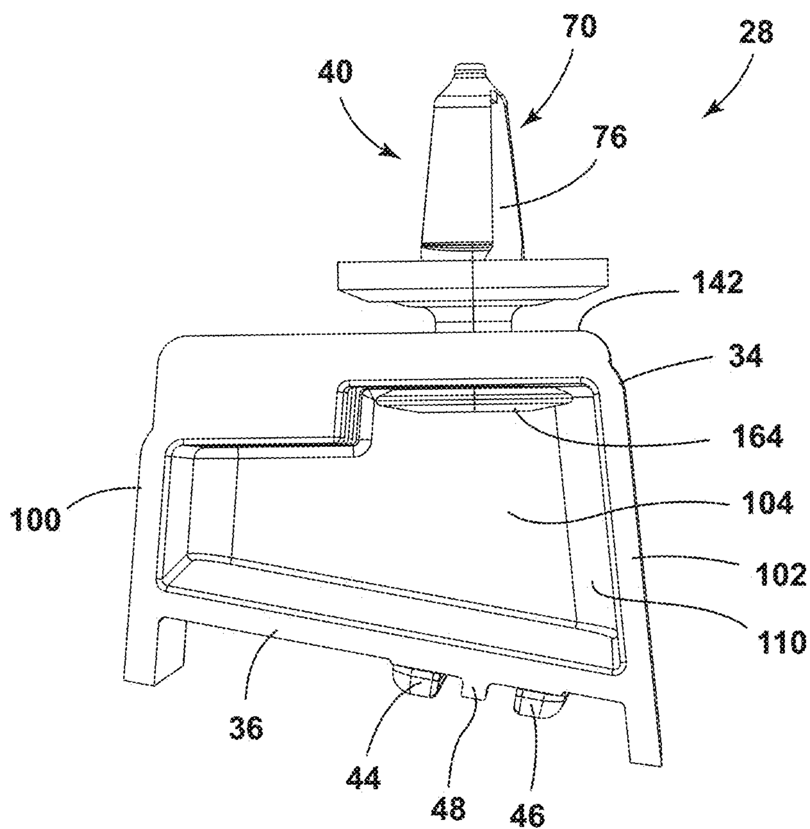
FIG. 14 is a front elevation view of another attachment feature for a vehicle trim assembly, according to the present disclosure.
Figure 15:
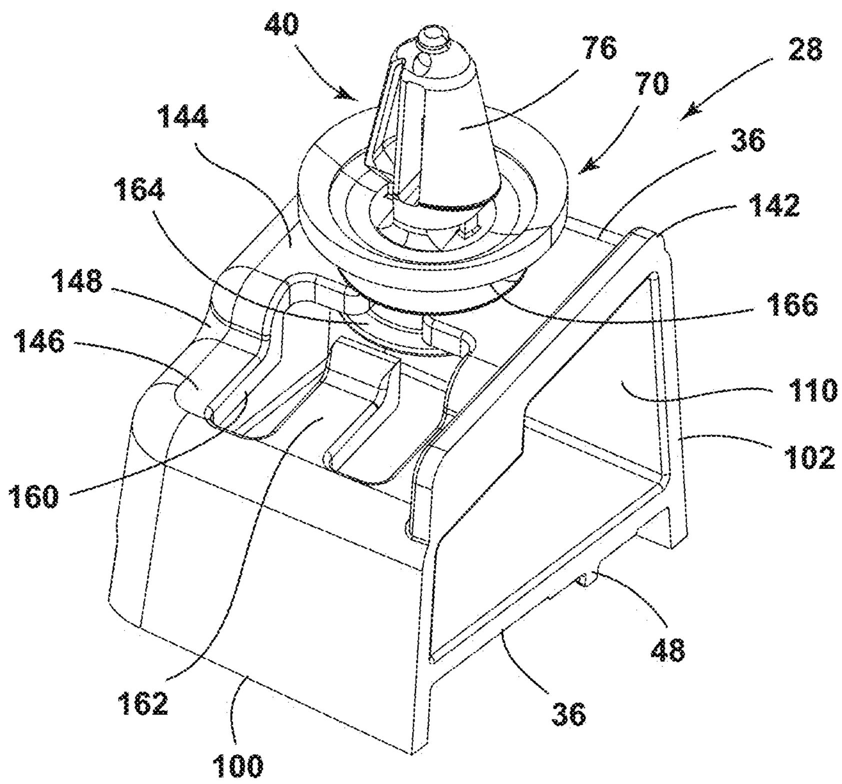
FIG. 15 is a side perspective view of an attachment feature for a vehicle trim assembly, according to the present disclosure.

Referring to FIGS. 14 and 15, the third attachment feature 70 is illustrated. The third attachment feature 70 includes the base 34, which has many similarities to the bases 34 of the first and second attachment features 30, 32. For the third attachment feature 70, the base 34 is wider between the first and second side supports 100, 102 to accommodate an extension for coupling the third clip 76 to the distal support 38.

The proximal support 36 includes a rim 142 disposed proximate to the open side, a coupling portion 144, and a recessed portion 146. The recessed portion 146 is offset from the coupling portion 144 by a wall 148. The coupling portion 144 aligns with the guide features 44, 46 and the protrusion 48 on the proximal support 36. Moreover, the interior cavity 110 has a first height between the proximal support 36 and the coupling portion 144 of the distal support 38, and a second lesser height between the recessed portion 146 of the distal support 38 and the proximal support 36.

The distal support 38 defines a receiving slot 160, which is generally Y-shaped. One portion of the receiving slot 160 is defined on the recessed portion 146 (e.g., generally "V" or "U" shaped), and a second portion is defined by the coupling portion 144 (e.g., generally a linear portion). A clip retainer 162 extends from the recessed portion 146 of the distal support 38 into the recessed slot to define a portion of the "Y" shape. The clip retainer 162 is configured to flex or elastically deform into the interior cavity 110 in response to a force applied by the third clip 76. The clip retainer 162 is biased toward a retaining state, extending generally parallel with the recessed portion 146 of the distal support 38, and is configured to assist in retaining the third clip 76 in the receiving slot 160. When the third clip 76 is fully positioned within the receiving slot 160 in the coupling portion 144, a biasing force of the clip retainer 162 returns the clip retainer 162 toward the retaining state.

The third clip 76 is configured as a pushpin clip, which includes a first stopper 164 disposed within the interior cavity 110, and a second stopper 166 disposed on an opposing side of the distal support 38 relative to the first stopper 164. The third clip 76 is configured to align with the first and second guide features 44, 46 and the protrusion 48 on the proximal support 36.

Referring to FIGS. 1-15, a variety of attachment features 28 may be interchanged with one another to be coupled to the trim panel 14. The clips 40 may be configured as any practicable type of clip for engaging the vehicle body 42. Moreover, the base 34 for each attachment feature 28 may differ slightly to support the different clips 40, such as having a clip tower, a pushpin hole, a locator, a stand off, etc. The various types of attachment features 28 with the differing clips 40, provide interchangeable and diverse attachments of the trim panel 14. Each clip 40 may be used for different purposes and functions in coupling the trim panel 14 to the vehicle body 42.

Figure 16:
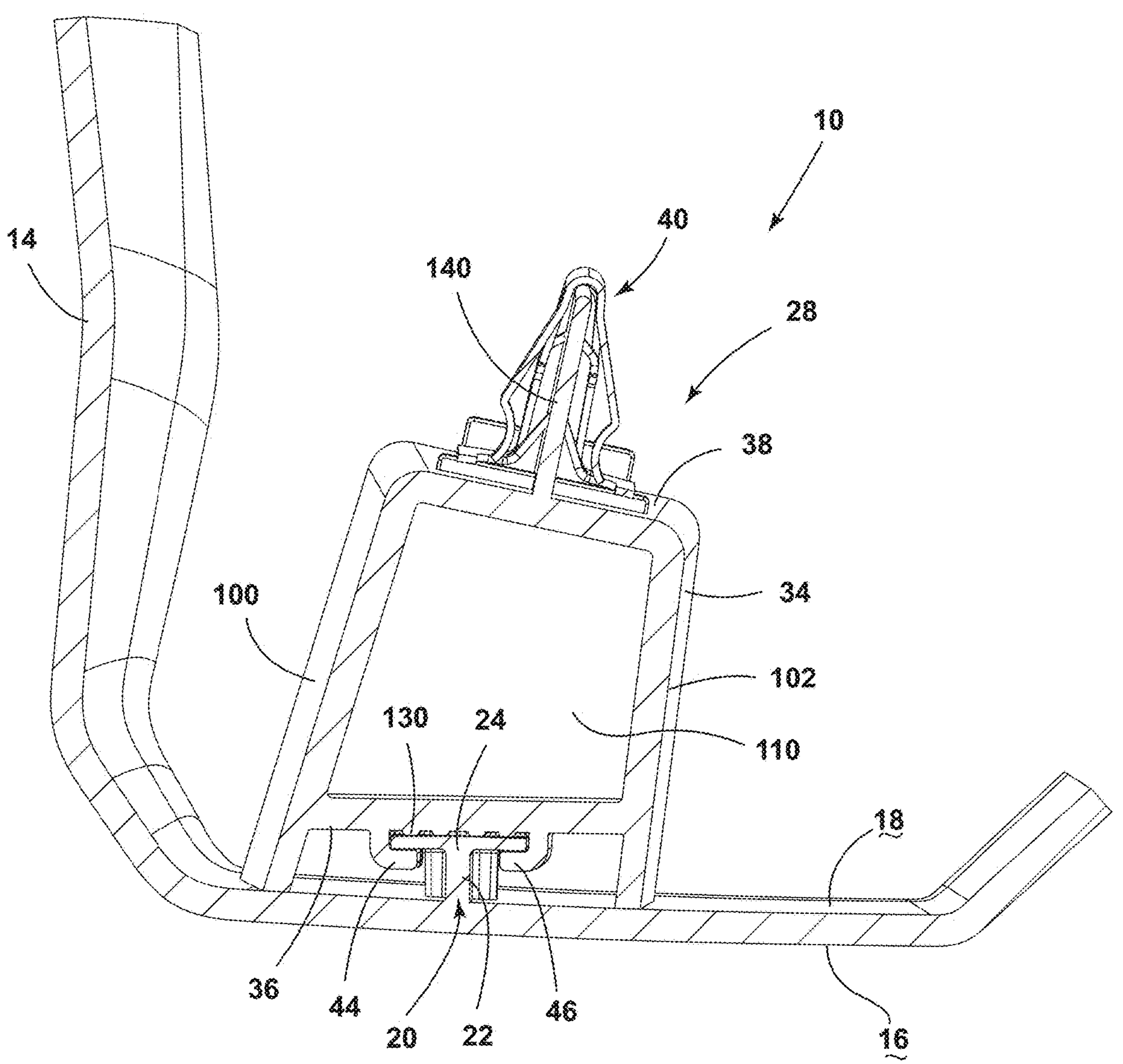
FIG. 16 is a cross-sectional view of the trim assembly of FIG. 4, taken along the lines XVI-XVI, according to the present disclosure.
Figure 17:
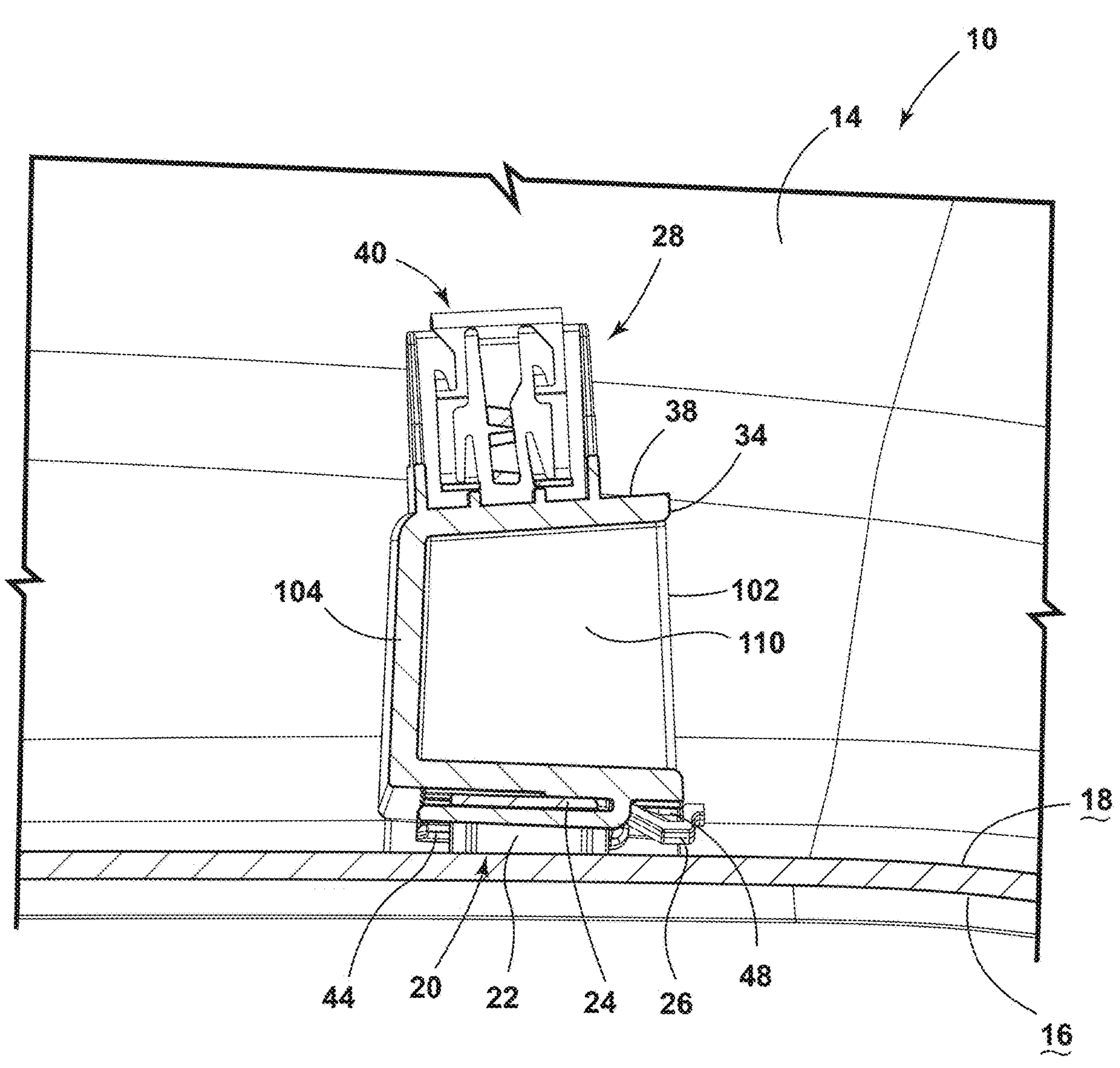
FIG. 17 is another cross-sectional view of the trim assembly of FIG. 4, taken along the lines XVII-XVII, according to the present disclosure.

Referring to FIGS. 16 and 17, as well as further reference to FIGS. 1-15, the attachment feature 28 with the selected type of clip 40 is chosen to be coupled to the trim panel 14. The attachment feature 28 is disposed proximate to the retaining member 20 with the open ends 120 of the guide features 44, 46 oriented toward the retaining member 20. Further, the attachment feature 28 is positioned proximate to the locking arm 26.

The attachment feature 28 is moved over the locking arm 26 and over the engagement plate 24 with the engagement plate 24 being received in the guide features 44, 46. The guide features 44, 46 extend under the engagement plate 24 to proximate the connector 22. Accordingly, the T-shaped construction of the retaining member 20 allows the guide features 44, 46 to receive the engagement plate 24 without being impinged by the connector 22. The longer first and second side supports 100, 102 extend on opposing sides of the retaining member 20 to be disposed adjacent to or abut the B-surface 18 of the trim panel 14. The attachment feature 28 is slidably engaged over the retaining member 20 until the engagement plate 24 abuts the closed ends 122 of the guide features 44, 46.

As the attachment feature 28 is moved relative to the retaining member 20, the protrusion 48 of the attachment feature 28 is configured to engage the locking arm 26. The distal tab 90 of the locking arm 26 is configured to slidably engage the angled sliding surface 124 of the protrusion 48. The protrusion 48 provides the force on the distal tab 90 to overcome the biasing force, causing the locking arm 26 to flex or elastically deform toward the B-surface 18 of the trim panel 14. Once the engagement plate 24 is abutting the closed ends 122 of the guide features 44, 46, the protrusion 48 disengages the distal tab 90. Accordingly, biasing force of the locking arm 26 returns the locking arm 26 to the default condition and the protrusion 48 is positioned in the retaining space defined by the locking arm 26. The retaining portion 84 abuts the outer end 128 of the protrusion 48. Accordingly, the locking arm 26 is configured to snap-engage the protrusion 48 and lock the attachment feature 28 in position on the trim panel 14.

The attachment feature 28 is coupled to the B-surface 18 of the trim panel 14 via the retaining member 20. The attachment feature 28 extends away from the B-surface 18 and is configured to engage the vehicle body 42 to retain the trim assembly 10 in the selected location.

In order to remove or interchange the attachment feature 28, a user may apply force to the distal tab 90 to flex or elastically deform the locking arm 26 toward the surface of the trim panel 14 and away from the protrusion 48. The movement of the locking arm 26 adjusts the locking arm 26 away from the protrusion 48, providing space for the protrusion 48 to move out of the retaining space. The attachment feature 28 is moved to disengage the protrusion 48 from the locking arm 26 and disengage the engagement plate 24 from the guide features 44, 46. The attachment feature 28 is then removed from the trim panel 14, and a different attachment feature 28 can be coupled to the retaining member 20.

Figure 18:
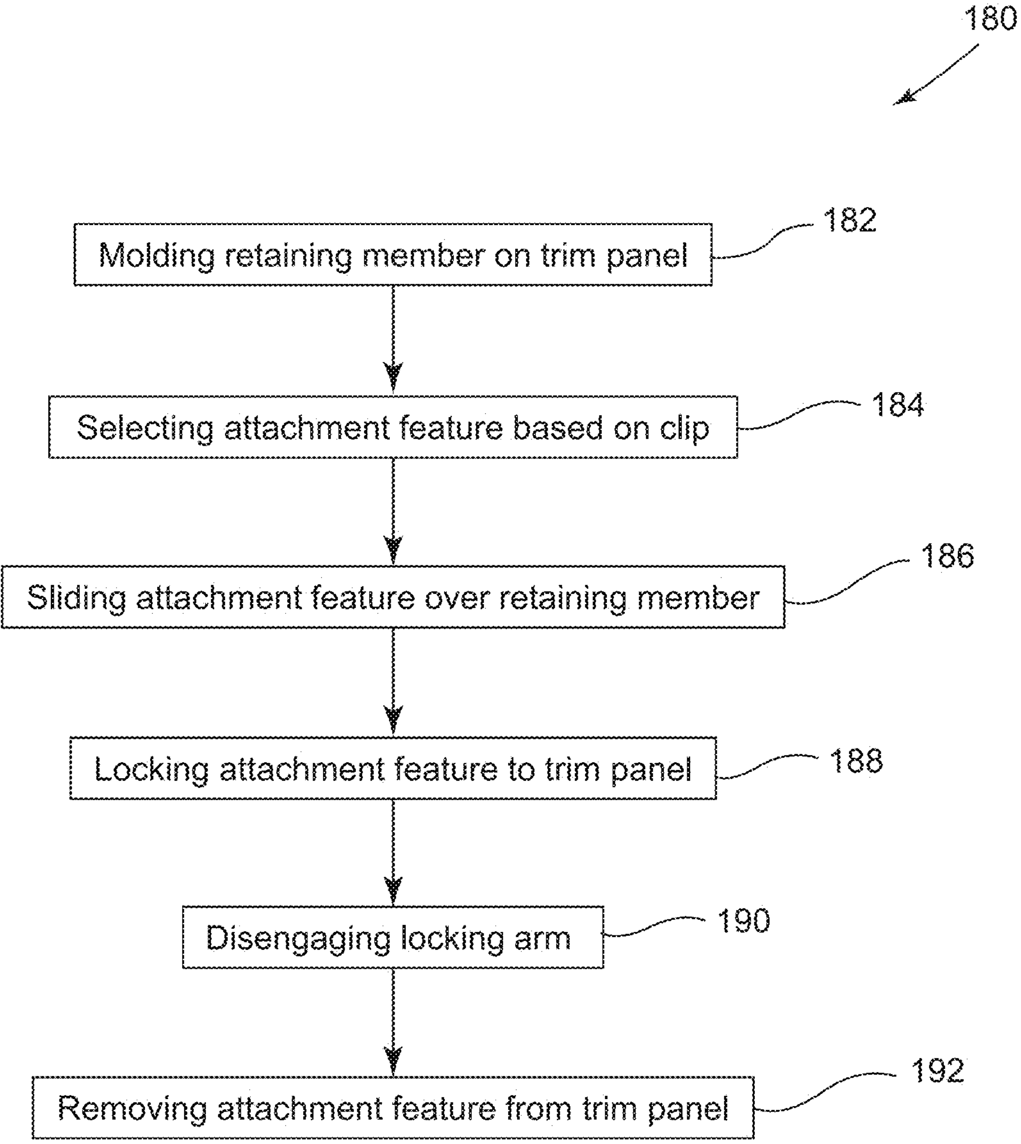
FIG. 18 is a flow diagram for a method of assembling a trim assembly for a vehicle, according to the present disclosure.

Referring to FIG. 18, as well as FIGS. 1-17, a method 180 of assembling a trim assembly 10 includes step 182 of molding the retaining member 20 on the trim panel 14. The retaining member 20 may be molded simultaneously with the molding of the trim panel 14 or may be overmolded onto the B-surface 18 of the trim panel 14. In step 184, the attachment feature 28 is selected based on a variety of factors. The attachment feature 28 may be chosen based on the type of clip 40, the type of trim panel 14, the location of the trim panel 14 when installed in the vehicle 12, etc. Step 184 may also include forming the attachment feature 28. The base 34 may be printed through an additive manufacturing process and the clip 40 may be coupled to the printed clip support 140 or inserted in the receiving slot 160.

The base 34 may be formed using any practicable added to the manufacturing process, for example, but not limited to, extrusion additive manufacturing (e.g., fused filament fabrication), photopolymerization additive manufacturing (e.g., stereolithography or SLA), powder bed fusion additive manufacturing, material jetting additive manufacturing, binder jetting additive manufacturing, directed energy deposition additive manufacturing, lamination, additive manufacturing, and/or any combination or combinations thereof. The additive manufacturing process may be advantageous for maximizing efficiency in the manufacturing and development process of the trim assembly 10.

Generally, in additive manufacturing processes, digital three-dimensional design data is used to build components in layers by depositing materials on a build platform. The material within the layers and the material of the separate layers may be bonded or fused together through the use of laser beams directed at points indicated by the computer-generated design data. Layers are added on top of one another and fused to bond with the previous layers at predefined points.

In a non-limiting example, the attachment feature 28 may be formed using the SLA additive manufacturing process. In such examples, a build platform is positioned within a tank of liquid polymer. An ultraviolet light may create a layer on the build platform by selectively curing and solidifying the photopolymer resin. A laser beam is focused in a predetermined path using a set of mirrors. The whole cross-sectional area of the model is scanned, so the produced part is fully solid. A sweeper blade can recoat the surface. The process may then repeat until the part is complete. The SLA additive manufacturing process may use post-processing under ultraviolet light for high mechanical and thermal properties. The liquid resin may be solidified through a photopolymerization process.

During solidification, monomer carbon chains within the liquid resin may be activated by the ultraviolet light to become solid. The photopolymerization process may be irreversible, such that the SLA parts may remain in solid form when heated. Accordingly, materials produced using SLA may be constructed of thermoset polymers. For example, the polymer resin may include photosensitive thermoset polymers that come in liquid form. Through the SLA additive manufacturing process, the attachment feature 28 may be formed by selectively curing a polymer resin layer-by-layer using an ultraviolet laser beam. Accordingly, in step 184 the base 34 may be printed with plastic materials. Moreover, each of the proximal support 36, the distal support 38, and the side supports 100, 102, 104 may be printed to have a thickness in a range between about 2 mm and about 3 mm. The interior cavity 110 may be advantageous for minimizing the weight and providing a more efficient printing process for forming the attachment feature 28.

In step 186, the attachment feature 28 is slidably engaged over the retaining member 20. The first and second side supports 100, 102 may slide along the B-surface 18 of the trim panel 14. The proximal support 36 slides over the engagement plate 24, with the engagement plate 24 being received within the guide features 44, 46. In step 188, the attachment feature 28 is locked to the trim panel 14 through the engagement between the locking arm 26 and the protrusion 48. The protrusion 48 applies force to the distal tab 90 of the locking arm 26 and the attachment feature 28 is moved over the retaining member 20 to elastically deform the locking arm 26 against the biasing force thereof. Once the protrusion 48 disengages from the distal tab 90, the biasing force of the locking arm 26 adjusts the locking arm 26 to snap-engage the protrusion 48, locking the attachment feature 28 in place over the retaining member 20.

In step 190, the locking arm 26 is disengaged and the attachment feature 28 is “unlocked” from the trim panel 14.

The user may apply a force to the distal tab 90 of the locking arm 26 against the biasing force to flex the locking arm 26 toward the B-surface 18 of the trim panel 14. In step 192, the attachment feature 28 is moved to disengage the guide features 44, 46 from the engagement plate 24 and remove the attachment feature 28 from the trim panel 14. The steps of the method 180 may be performed in any order, sequentially, concurrently, omitted, or repeated without departing from the teachings herein.

Referring still to FIGS. 1-18, the interchangeable attachment features 28 may be particularly advantageous for the development process when developing and manufacturing the trim assembly 10. For example, a prototype of the trim panel 14 may be manufactured with one type of clip 40, and, during the development process, it may be found that a second type of clip 40 may be better for the specific situation. Often, in conventional designs, a trim attachment is integrally formed with a trim piece. In such conventional designs, a change in the trim attachment results in a new prototype being made. As the trim attachments are around 10% of the whole trim piece, this results in a less efficient development process.

In comparison, the trim assembly 10 described herein includes the retaining member 20, which can selectively engage different types of interchangeable attachment features 28. Accordingly, when using the trim assembly 10 described herein, the attachment features 28 may be interchanged in response to a selected change in the clip 40. The trim panel 14 may remain the same, resulting in a more efficient manufacturing and development process. Though described with respect to the development process, the trim assembly 10 may be prototypes for development, a final product installed in the vehicle 12, or both without departing the teachings herein.

The trim assembly 10 may be utilized for multiple types of trim panels 14. Moreover, the vehicle body 42 in which the trim assembly 10 is utilized may be a manually operated vehicle (e.g., with a human driver), a fully autonomous vehicle 12 (e.g., with no human driver), or a partially autonomous vehicle 12 (e.g., operated with or without a human driver). These vehicles 12 may be any style vehicle 12, which may be a sedan, a sport utility vehicle, a truck, a van, a crossover, etc. The vehicle 12 may also be utilized for personal and/or commercial purposes, such as, for example, ride-providing services (e.g., chauffeuring), ridesharing services, and delivery or transport services.

Use of the present device may provide a variety of advantages. For example, the trim panel 14 may have the molded retaining member 20 on the B-surface 18 thereof to selectively engage the attachment features 28. Further, multiple attachment features 28 may be manufactured through the additive manufacturing process to provide different types of clips 40 for coupling the trim panel 14 to the vehicle body 42. Additionally, the attachment features 28 may be interchanged, providing an efficient development process for the trim assembly 10, particularly when the type of clip 40 is to be changed during development. Also, each of the attachment features 28 includes the guide features 44, 46 for receiving the engagement plate 24 of the retaining member 20. Further, the attachment features 28 are configured to be locked over the retaining member 20 to the trim panel 14 via the engagement between the protrusion 48 and the locking arm 26. Additional or alternative advantages may be realized and/or achieved.

According to various examples, a vehicle trim assembly includes a trim panel having an A-surface and a B-surface. The trim panel defines a retaining member on the B-surface. The retaining member includes a connector extending from the B-surface. An engagement plate is coupled to the connector. The engagement plate has a width greater than a width of the connector. The engagement plate includes a locking arm extending therefrom. A first attachment feature is engageable with the retaining member in a first use condition. A second attachment feature is engageable with the retaining member in a second use condition. Each of the first attachment feature and the second attachment feature includes a base having a proximal support and a distal support, a clip coupled to the distal support and configured to engage a vehicle body, and guide features coupled to the proximal support. The guide features are configured to receive the engagement plate of the retaining member. A protrusion is coupled to the proximal support. The locking arm is configured to engage the protrusion to lock the base on the retaining member. Embodiments of the present disclosure may include one or a combination of the following features:

- a locking arm is configured to elastically deform in response to the protrusion;
- a clip of the first attachment feature is different than the clip of a second attachment feature;
- a base defines an interior cavity;
- the base includes ribs within an interior cavity;
- a retaining member has a "T" shaped cross-section;
- a locking arm has a receiving portion that extends from a tapered end of the engagement plate toward a B-surface of a trim panel;
- a locking arm includes a distal tab; and
- a locking arm is configured to move toward a B-surface to disengage a protrusion in response to a force applied to a distal tab.

According to various examples, a trim assembly for a vehicle includes a trim panel having an inner surface. The trim panel integrally defines a retaining member on the inner surface. The retaining member includes a locking arm. At least one attachment feature is engageable with the trim panel via the retaining member. The at least one attachment feature includes a base having a proximal support and a distal support. A clip is coupled to the distal support and configured to engage a body panel. Guide features are coupled to the proximal support and configured to receive the retaining member to couple the at least one attachment feature to the trim panel. A protrusion is coupled to the proximal support. The locking arm is configured to engage the protrusion to lock the at least one attachment feature to the trim panel. Embodiments of the present disclosure may include one or a combination of the following features:

- at least one attachment feature includes a first attachment feature and a second attachment feature;
- the clip of the first attachment is different than the clip of the second attachment feature;
- each guide feature has an open end for receiving a retaining member and a closed end;
- the protrusion is disposed proximate to the closed ends;
- a protrusion has an angled surface configured to slidably engage a distal tab of the locking arm as the at least one attachment feature is slidably engaged over a retaining member;
- a locking arm has a receiving portion extending from an end of a retaining member toward the B-surface of a trim panel and a retaining portion configured to extend from a receiving portion away from a B-surface;
- a locking arm includes a distal tab extending from a retaining portion;

a locking arm is configured to elastically deform in response to force applied to a distal tab;

a retaining member includes a connector extending from a B-surface and has a first width and an engagement plate coupled to a connector and has a second width;

a second width is greater than a first width;

a retaining member has a "T" cross-sectional shape; and a guide feature is configured to receive the engagement plate.

According to various examples, a vehicle trim attachment feature includes a base having a distal support spaced from a proximal support via side supports. The distal support, the proximal support, and the side supports define a cavity. A clip is coupled to the distal support and configured to engage a vehicle body panel. A first guide feature is coupled to the proximal support. A second guide feature is coupled to the proximal support and extends parallel to the first guide feature. The first guide feature and the second guide feature are configured to slidably receive a retaining member of a trim panel. A protrusion is coupled to the proximal support proximate to the first guide feature and the second guide feature. The protrusion is configured to engage the retaining member to retain the body in a select position on the trim panel. Embodiments of the present disclosure may include one or a combination of the following features:

a distal support defines a slot for receiving a clip;

a first guide feature and a second guide feature each has a closed end and a protrusion is coupled to a proximal support proximate each of the closed ends;

a base includes ribs extending between a distal support and a proximal support;

a protrusion has an angled engagement surface; and an outer end of the protrusion has a height greater than an inner end.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle trim assembly, comprising:

a trim panel having an inner surface;

a retaining member disposed on the inner surface of the trim panel, the retaining member including:

an engagement plate having a first end and a second end, wherein the engagement plate is coupled to the inner surface of the trim panel via a connector; and a locking arm extending from the first end of the engagement plate and operable between a default condition and a deformed condition, wherein the locking arm includes a receiving portion and a retaining portion; and an attachment feature slidably engaged with the retaining member, wherein the attachment feature includes guide features and a protrusion.

2. The vehicle trim assembly of claim 1, wherein the first end of the engagement plate has a tapered end proximate the locking arm, and wherein the tapered end has a width less than a width of the second end of the engagement plate for slidably receiving the attachment feature.

3. The vehicle trim assembly of claim 1, wherein the receiving portion of the locking arm includes a first segment that extends from the engagement plate toward the inner surface of the trim panel and a second segment that extends parallel with the engagement plate.

4. The vehicle trim assembly of claim 1, wherein the retaining portion of the locking arm extends from the receiving portion and away from the inner surface of the trim panel.

5. The vehicle trim assembly of claim 1, wherein the receiving portion includes a distal tab that extends perpendicular to the retaining portion and parallel with the engagement plate to engage with the protrusion to lock the attachment feature to the retaining feature.

6. The vehicle trim assembly of claim 5, wherein a surface of the engagement plate and a surface of the distal tab are coplanar when the locking arm is in the default position.

7. The vehicle trim assembly of claim 1, wherein the attachment feature includes a base having a proximal support and a distal support, and wherein the attachment feature includes side supports extending between the proximal support and the distal support.

8. The vehicle trim assembly of claim 7, wherein the guide features include a first guide feature and a second guide feature coupled to the proximal support of the attachment feature between side supports, and wherein each of the first guide feature and the second guide feature include open ends for receiving the engagement plate and closed ends for abutting the engagement plate when the attachment feature is installed.

9. The vehicle trim assembly of claim 8, wherein the protrusion is positioned between the first and second guide features proximate the closed ends, and wherein the protrusion is configured to provide a force on the locking arm to adjust the locking arm toward the inner surface of the trim panel to the deformed condition.

10. The vehicle trim assembly of claim 5, wherein the protrusion includes an angled sliding surface, and wherein the distal tab of the locking arm is configured to slidably engage the angled sliding surface of the protrusion.

11. A trim assembly for a vehicle, comprising:

a trim panel having an inner surface;

a retaining member disposed on the inner surface of the trim panel, wherein the retaining member includes a locking arm; and at least one attachment feature selectively engaged with the retaining member, the at least one attachment feature including:

a first guide feature and a second guide feature each having an open end configured to receive the retaining member and a closed end configured to abut the retaining member; and a protrusion positioned between the closed ends of the first guide feature and the second guide feature, wherein the protrusion includes an engagement surface and is configured to engage the locking arm of the retaining member when the at least one attachment feature is selectively coupled to the inner surface of the trim panel.

12. The trim assembly of claim 11, wherein the at least one attachment feature includes a first attachment feature and a second attachment feature, and wherein each of the first and second attachment features includes a base having a proximal support and a distal support.

13. The trim assembly of claim 12, wherein the base of the at least one attachment feature includes ribs on the proximal support, the ribs extending parallel to and between the first guide feature and the second guide feature to promote a sliding engagement between the base and the retaining member.

14. The trim assembly of claim 12, further comprising:

first and second clips configured to engage a body of said vehicle, wherein for each of the first and second attachment feature the proximal support couples the first guide feature and the second guide feature and the distal support couples with one of the first and second clips.

15. The trim assembly of claim 14, wherein the first attachment feature and the second attachment feature each include a clip support configured to receive a respective one of the first and second clips.

16. The trim assembly of claim 12, wherein the at least one attachment feature further includes a third attachment feature, wherein the third attachment feature includes a clip retainer that extends from a distal support and is configured to elastically deform in response to a force applied by a clip.

17. A method for assembling a trim assembly, comprising:

providing a trim panel having an inner surface;

molding a retaining member on the inner surface of the trim panel, wherein the retaining member includes a locking arm;

selecting at least one interchangeable attachment feature having a proximal support including guide features and a protrusion and a distal support including a clip support;

slidably engaging the at least one interchangeable attachment feature over the retaining member; and locking the at least one interchangeable attachment feature to the inner surface of the trim panel through an engagement between the locking arm and the protrusion.

18. The method of claim 17, further comprising:

applying a force to the retaining member to move the locking arm toward the inner surface of the trim panel;

disengaging the guide features from the retaining member; and removing the at least one interchangeable attachment feature from the retaining member.

19. The method of claim 17, wherein the step of molding the retaining member includes over molding the retaining member onto the inner surface of the trim panel.

20. The method of claim 17, wherein the step of selecting the at least one interchangeable attachment feature includes selecting a first attachment feature having a first clip, a second attachment feature having a second clip, and a third attachment feature having a third clip, and wherein each of the first, second, and third clips are configured to be disposed in the clip support, respectively.

* * * * *